United States Patent
Li

(10) Patent No.: US 8,217,101 B2
(45) Date of Patent: Jul. 10, 2012

(54) FLAME RETARDANT THERMOPLASTIC MOLDING COMPOSITION

(75) Inventor: Xiangyang Li, Seven Fields, PA (US)

(73) Assignee: Bayer MaterialScience LLC, Pittsburgh, PA (US)

( * ) Notice: Subject to any disclaimer, the term of this patent is extended or adjusted under 35 U.S.C. 154(b) by 425 days.

(21) Appl. No.: 11/713,352

(22) Filed: Mar. 2, 2007

(65) Prior Publication Data

US 2008/0214731 A1 Sep. 4, 2008

(51) Int. Cl.
*C08K 5/523* (2006.01)

(52) U.S. Cl. ......... 524/127; 524/140; 524/141; 524/404

(58) Field of Classification Search .................. 524/117, 524/140, 141, 404, 127
See application file for complete search history.

(56) References Cited

U.S. PATENT DOCUMENTS

| | | | |
|---|---|---|---|
| 4,888,388 A | 12/1989 | Hongo et al. | 525/67 |
| 4,963,619 A | 10/1990 | Wittmann et al. | 525/67 |
| 5,153,251 A | 10/1992 | Lupinski et al. | |
| 5,266,218 A | 11/1993 | Roe et al. | 210/764 |
| 6,369,141 B1 | 4/2002 | Ishii et al. | |
| 6,369,142 B1 * | 4/2002 | Nodera et al. | 524/141 |
| 6,423,766 B1 | 7/2002 | Itagaki | 524/127 |
| 6,569,930 B1 | 5/2003 | Eckel et al. | |
| 6,596,800 B1 | 7/2003 | Zobel et al. | 524/432 |
| 7,067,567 B2 | 6/2006 | Seidel et al. | 523/201 |
| 2004/0059031 A1 | 3/2004 | Seidel et al. | |
| 2006/0293422 A1 | 12/2006 | Seidel et al. | |

FOREIGN PATENT DOCUMENTS

| | | |
|---|---|---|
| JP | 4-345657 | 12/1992 |
| JP | 6-239965 | 8/1994 |
| JP | 7-316409 | 12/1995 |
| JP | 08208972 A | 8/1996 |
| JP | 8-259791 | 10/1996 |
| JP | 2001-31860 | 2/2001 |

* cited by examiner

*Primary Examiner* — Peter Szekely
(74) *Attorney, Agent, or Firm* — John E. Mrozinski, Jr.

(57) ABSTRACT

A thermoplastic molding composition characterized by its flame retardance is disclosed. The composition contains A) aromatic poly(ester) carbonate having a weight-average molecular weight of at least 25,000, B) (co)polyester and C) graft (co)polymer having a core-shell morphology, comprising a grafted shell that contains polymerized alkyl(meth)acrylate and a composite rubber core that contains interpenetrated and inseparable polyorganosiloxane and poly(meth)alkyl acrylate where the weight ratio of polyorganosiloxane/poly(meth)alkylacrylate/grafted shell is 70-90/5-15/5-15, D) phosphorus-containing compound, E) fluorinated polyolefin and F) boron compound having average particle diameter of 2 to 10 microns.

15 Claims, No Drawings

FLAME RETARDANT THERMOPLASTIC MOLDING COMPOSITION

FIELD OF THE INVENTION

The invention relates to an impact-modified, flame retardant thermoplastic molding composition containing polycarbonate and (co)polyester.

TECHNICAL BACKGROUND OF THE INVENTION

Impact-modified blends of polycarbonate and aromatic polyesters are known. Corresponding flame resistant compositions are also known as are halogen-free flame retarding agents.

The art is noted to include U.S. Pat. No. 5,266,218 that disclosed a flame-retardant composition containing polycarbonate resin (or a blend of polycarbonate with another resin), a phosphorus compound, a boron compound, a polyorganosiloxane and/or from fluorine resin.

JP 2001 031 860 is considered to disclose a high impact strength composition said to be hydrolytically stable and chemically resistant. The composition contains polycarbonate, a mixture of polyethylene terephthalate and polybutylene terephthalate, a graft elastomer having a core-shell structure, a silicate salt, stabilized red phosphorus and polytetrafluoroethylene.

A composition containing aromatic polycarbonate resin, an aromatic polyester resin and a specific high-molecular weight halogenated bisphenol epoxy resin is disclosed in JP 6 239 965. The disclosed composition is said to feature excellent flame-retardance, chemical resistance, impact resistance and thermal stability. An impact modified thermoplastic molding composition containing polycarbonate, polyalkylene terephthalate and a graft (co)polymer wherein the graft base includes a rubber selected from a group that includes silicone-acrylate composite has been disclosed in U.S. Pat. No. 7,067,567. The graft (co)polymer is exemplified by methyl methacrylate-grafted silicone-butyl acrylate composite rubber. An impact resistance composition containing polycarbonate, polyethylene terephthalate and graft polymer based on a silicone-butyl acrylate composite rubber is disclosed in U.S. Pat. No. 4,888,388.

A flame retardant, chemically resistant and thermally stable composition containing a halogenated aromatic polycarbonate resin, aromatic polyester resin, and graft rubber polymer composite is disclosed in JP 04 345 657. The graft rubber is said to be obtained by grafting vinyl monomer(s) onto rubber particles consisting of a poly-organosiloxane rubber and a polyalkyl(meth)acrylate rubber entangled with each other so as not to be separated from each other.

JP8259791 is considered to disclose a flame-retardant resin composition said to feature excellent impact resistance and flame retardance and containing polycarbonate resin with a phosphoric ester compound and a specific composite-rubber-based graft copolymer. The composite-rubber-based graft copolymer is obtained by grafting at least one vinyl monomer (e.g. methyl methacrylate) onto a composite rubber that contains 30-99% polyorganosiloxane component and 70-1% of poly alkyl(meth)acrylate rubber component.

JP 7316409 disclosed a composition having good impact resistance and flame retardance containing polycarbonate, phosphoric ester and a specified graft copolymer based on a composite rubber. The graft copolymer is obtained by graft polymerization of one or more vinyl monomers onto a composite rubber in which polyorganosiloxane component and polyalkyl(meth)acrylate rubber component are entangled together so as not to be separable.

U.S. Pat. No. 4,963,619 disclosed a thermoplastic polycarbonate molding composition containing polycarbonates, siloxane-containing graft polymers and, optionally, other thermoplastics and/or standard additives. The composition is said to feature high toughness, particularly at low temperatures.

U.S. Pat. No. 6,423,766 disclosed a flame-retardant polycarbonate resin composition, containing polycarbonate resin, a composite rubbery graft copolymer, a halogen-free phosphoric ester and polytetrafluoroethylene. The composition is said to exhibit improved mechanical properties, moldability, flowability, and flame retardance. The graft rubber is based on polyorganosiloxane rubber component and polyalkyl acrylate rubber component and the two components are intertwisted and inseparable from each other. The grafted rubber is grafted with one or more vinyl monomers.

U.S. Pat. No. 6,596,800 disclosed a thermoplastic molding composition containing polycarbonate, a graft polymer and an additive amount of zinc compound. The composition is said to exhibit improved yellowness index and mechanical properties. The zinc compound is characterized in that its average particle diameter is 1 nm to 20 microns. Zinc borate was disclosed in U.S. Pat. No. 4,833,190 for its efficacy as smoke suppressant in silicone containing compositions having hydrocarbon content

SUMMARY OF THE INVENTION

A thermoplastic molding composition characterized by its flame retardance is disclosed. The composition contains A) 60 to 99 parts by weight of aromatic poly(ester) carbonate B) 1 to 40 parts by weight of (co)polyester, the total weight of A) and B) being 100 parts resin, and C) 1 to 20 parts per hundred parts resin (phr) of graft (co)polymer having a core-shell morphology, including a grafted shell that contains polymerized alkyl(meth)acrylate and a composite rubber core that contains interpenetrated and inseparable polyorganosiloxane and poly(meth)alkyl acrylate components, D) 2 to 20 phr of a phosphorous-containing compound, E) 0.1 to 2 parts by weight of fluorinated polyolefin, and F) 0.1 to 15 parts by weight of a boron compound having average particle diameter of 2 to 10 microns.

DETAILED DESCRIPTION OF THE INVENTION

The inventive composition contains
A) 60 to 99 percent by weight (pbw), preferably 70 to 95 pbw, most preferably 70 to 85 pbw of aromatic poly(ester) carbonate having a weight-average molecular weight of at least 25,000 preferably at least 26,000 g/mol.,
B) 1 to 40 preferably 5 to 30 most preferably 15 to 30 pbw of (co)polyester, wherein the weight of A) and B) totals 100 parts (100 parts resin),
C) 1 to 20 preferably 2 to 15, more preferably 5 to 12 most preferably 7 to 10 parts per 100 parts resin (herein phr) of a graft (co)polymer having a core-shell morphology, comprising a grafted shell that contains polymerized alkyl (meth)acrylate and a composite rubber core that contains interpenetrated and inseparable polyorganosiloxane and poly(meth)alkyl acrylate components, where the weight ratio of polyorganosiloxane/poly(meth)alkylacrylate/rigid shell is 70-90/5-15/5-15,
D) 2 to 20, preferably 5 to 15, particularly preferably 7 to 15, most preferably 10 to 15 phr of a phosphorus-containing compound, preferably organic phosphoric or phosphonic acid ester, E) 0.1 to 2, preferably 0.2 to 1, most preferably 0.2 to 0.5 phr of fluorinated polyolefin and F) 0.1 to 15, preferably 1 to 10, most preferably 2 to 8 phr of a boron compound, preferably zinc borate having average particle diameter of 2 to 10 microns.

Any numerical range recited herein is intended to include all sub-ranges subsumed therein.

Component A

Suitable aromatic (co)polycarbonates and/or aromatic polyester carbonates are known. (Co)polycarbonates may be prepared by known processes (see for instance Schnell's "Chemistry and Physics of Polycarbonates", Interscience Publishers, 1964) and are widely available in commerce, for instance from Bayer MaterialScience under the trademark Makrolon®.

Aromatic polycarbonates may be prepared by the known melt process or the phase boundary process.

Aromatic dihydroxy compounds suitable for the preparation of aromatic polycarbonates and/or aromatic polyester carbonates conform to formula (I)

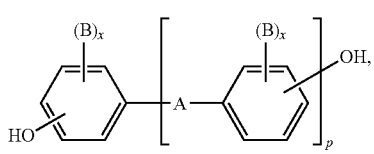

wherein

A represents a single bond, $C_1$- to $C_5$-alkylene, $C_2$- to $C_5$-alkylidene, $C_5$- to $C_6$-cycloalkylidene, —O—, —SO—, —CO—, —S—, —SO$_2$—, $C_6$- to $C_{12}$-arylene, to which there may be condensed other aromatic rings optionally containing hetero atoms, or a radical conforming to formula (II) or (III)

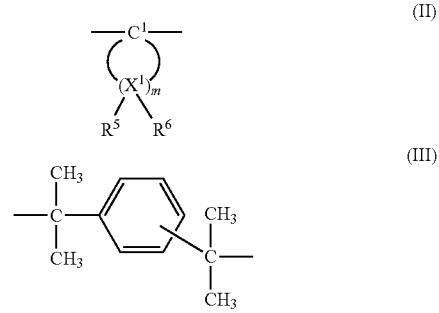

The substituents B independently one of the others denote $C_1$- to $C_{12}$-alkyl, preferably methyl, x independently one of the others denote 0, 1 or 2, p represents 1 or 0, and $R^5$ and $R^6$ are selected individually for each $X^1$ and each independently of the other denote hydrogen or $C_1$- to $C_6$-alkyl, preferably hydrogen, methyl or ethyl, $X^1$ represents carbon, and m represents an integer of 4 to 7, preferably 4 or 5, with the proviso that on at least one atom $X^1$, $R^5$ and $R^6$ are both alkyl groups.

Preferred aromatic dihydroxy compounds are hydroquinone, resorcinol, dihydroxydiphenols, bis-(hydroxyphenyl)-$C_1$-$C_5$-alkanes, bis-(hydroxyphenyl)-$C_5$-$C_6$-cycloalkanes, bis-(hydroxyphenyl)ethers, bis-(hydroxyphenyl)sulfoxides, bis-(hydroxyphenyl)ketones, bis-(hydroxyphenyl)-sulfones and α,α-bis-(hydroxyphenyl)-diisopropyl-benzenes. Particularly preferred aromatic dihydroxy compounds are 4,4'-dihydroxydiphenyl, bisphenol A, 2,4-bis-(4-hydroxyphenyl)-2-methylbutane, 1,1-bis-(4-hydroxyphenyl)-cyclohexane, 1,1-bis-(4-hydroxyphenyl)-3,3,5-trimethylcyclohexane, 4,4'-dihydroxydiphenyl sulfide, 4,4'-dihydroxydiphenyl-sulfone. Special preference is given to 2,2-bis-(4-hydroxyphenyl)-propane (bisphenol A). These compounds may be used individually or in the form of any desired mixtures.

Chain terminators suitable for the preparation of thermoplastic aromatic polycarbonates include phenol, p-chlorophenol, p-tert.-butylphenol, as well as long-chained alkylphenols, such as 4-(1,3-tetra-methylbutyl)-phenol or monoalkylphenols or dialkylphenols having a total of from 8 to 20 carbon atoms in the alkyl substituents, such as 3,5-di-tert.-butylphenol, p-isooctylphenol, p-tert.-octylphenol, p-dodecylphenol and 2-(3,5-dimethylheptyl)-phenol and 4-(3,5-dimethylheptyl)-phenol. The amount of chain terminators to be used is generally 0.5 to 10% based on the total molar amount of the aromatic dihydroxy compounds used.

The polycarbonates may be branched in a known manner, preferably by the incorporation of 0.05 to 2.0%, based on the sum of the molar amount of the aromatic dihydroxy compounds use, of compounds having a functionality of three or more, for example compounds having three or more phenolic groups.

Aromatic polyestercarbonates are known. Suitable such resins are disclosed in U.S. Pat. Nos. 4,334,053; 6,566,428 and in CA 1173998 all incorporated herein by reference.

Aromatic dicarboxylic acid dihalides for the preparation of aromatic polyester carbonates include diacid dichlorides of isophthalic acid, terephthalic acid, diphenyl ether 4,4'-dicarboxylic acid and naphthalene-2,6-dicarboxylic acid. Particularly preferred are mixtures of diacid dichlorides of isophthalic acid and terephthalic acid in a ratio of from 1:20 to 20:1.

Branching agents may also be used in the preparation of suitable polyestercarbonates, for example, carboxylic acid chlorides having a functionality of three or more, such as trimesic acid trichloride, cyanuric acid trichloride, 3,3'-,4,4'-benzophenone-tetracarboxylic acid tetrachloride, 1,4,5,8-naphthalenetetracarboxylic acid tetrachloride or pyromellitic acid tetrachloride, in amounts of 0.01 to 1.0 mol. % (based on dicarboxylic acid dichlorides used), or phenols having a functionality of three or more, such as phloroglucinol, 4,6-dimethyl-2,4,6-tri-(4-hydroxyphenyl)-heptene-2,4,4-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenylmethane, 2,2-bis[4,4-bis(4-hydroxyphenyl)-cyclohexyl]-propane, 2,4-bis(4-hydroxyphenyl-isopropyl)-phenol, tetra-(4-hydroxyphenyl)-methane, 2,6-bis(2-hydroxy-5-methyl-benzyl)-4-methylphenol, 2-(4-hydroxyphenyl)-2-(2,4-dihydroxyphenyl)-propane, tetra-(4-[4-hydroxyphenyl-isopropyl]-phenoxy)-methane, 1,4-bis[4,4'-dihydroxytriphenyl)-methyl]-benzene, in amounts of from 0.01 to 1.0 mol. %, based on diphenols used. Phenolic branching agents can be placed in the reaction vessel with the diphenols, acid chloride branching agents may be introduced together with the acid dichlorides.

The content of carbonate structural units in the thermoplastic aromatic polyester carbonates is preferably up to 100 mol. %, especially up to 80 mol. %, particularly preferably up to 50 mol. %, based on the sum of ester groups and carbonate groups. Both the esters and the carbonates contained in the aromatic polyester carbonates may be present in the polycondensation product in the form of blocks or in a randomly distributed manner.

The thermoplastic aromatic poly(ester) carbonates have weight-average molecular weights (measured by gel permeation chromatography) of at least 25,000, preferably at least 26,000. Preferably these have maximum weight-average molecular weights of 35,000, more preferably up to 32,000, particularly preferably up to 30,000 g/mol. The thermoplastic aromatic poly(ester) carbonates may be used alone or in any desired mixture.

Component B

The term (co)polyester suitable as component (B), include homo-polyesters and co-polyesters resins, these are resins the molecular structure of which include at least one bond derived from a carboxylic acid, preferably excluding linkages derived from carbonic acid. These are known resins and may be prepared through condensation or ester interchange polymerization of the diol component with the diacid according to known methods. Examples are esters derived from the condensation of a cyclohexanedimethanol with an ethylene glycol with a terephthalic acid or with a combination of terephthalic acid and isophthalic acid. Also suitable are polyesters derived from the condensation of a cyclohexanedimethanol with an ethylene glycol with a 1,4-Cyclohexanedicarboxylic acid. Suitable resins include poly(alkylene dicarboxylates), especially poly(ethylene terephthalate) (PET), poly(1,4-butylene terephthalate) (PBT), poly(trimethylene terephthalate) (PTT), poly(ethylene naphthalate) (PEN), poly(butylenes naphthalate) (PBN), poly(cyclohexanedimethanol terephthalate) (PCT), poly(cyclohexanedimethanol-co-ethylene terephthalate) (PETG or PCTG), and poly(1,4-cyclohexanedimethyl-1,4-cyclohexanedicarboxylate) (PCCD).

U.S. Pat. Nos. 2,465,319; 3,953,394 and 3,047,539—all incorporated herein by reference, disclose suitable methods for preparing such resins. The suitable polyalkylene terephthalates are characterized by an intrinsic viscosity of at least 0.2 and preferably about at least 0.4 deciliter/gram as measured by the relative viscosity of an 8% solution in orthochlorophenol at about 25° C. The upper limit is not critical but it generally does not exceed about 2.5 deciliters/gram. Especially preferred polyalkylene terephthalates are those with an intrinsic viscosity in the range of 0.4 to 1.3 deciliter/gram.

The alkylene units of the polyalkylene terephthalates which are suitable for use in the present invention contain from 2 to 5, preferably 2 to 4 carbon atoms. Polybutylene terephthalate (prepared from 1,4-butanediol) and polyethylene terephthalate are the preferred polyalkylene tetraphthalates for use in the present invention. Other suitable polyalkylene terephthalates include polypropylene terephthalate, polyisobutylene terephthalate, polypentyl terephthalate, polyisopentyl terephthalate, and polyneopentyl terephthalate. The alkylene units may be straight chains or branched chains.

The polyalkylene terephthalates are reaction products of aromatic dicarboxylic acids or reactive derivatives thereof, such as dimethyl esters or anhydrides, and aliphatic, cycloaliphatic or araliphatic diols, and mixtures of those reaction products. Preferred polyalkylene terephthalates contain at least 80%, preferably at least 90%, based on the dicarboxylic acid component, of terephthalic acid radicals and at least 80%, preferably at least 90%, based on the moles of the diol component, of ethylene glycol and/or 1,4-butanediol radicals.

The preferred polyalkylene terephthalates may contain, in addition to terephthalic acid radicals, up to 20 mol. %, preferably up to 10 mol. %, of radicals of other aromatic or cycloaliphatic dicarboxylic acids having from 8 to 14 carbon atoms or aliphatic dicarboxylic acids having from 4 to 12 carbon atoms, such as radicals of phthalic acid, isophthalic acid, naphthalene-2,6-dicarboxylic acid, 4,4'-diphenyldicarboxylic acid, succinic acid, adipic acid, sebacic acid, azelaic acid, cyclohexanediacetic acid.

Also preferred are polyalkylene terephthalates that contain, in addition to ethylene glycol or 1,4-butanediol radicals, up to 20 mol. %, preferably up to 10 mol. %, of other aliphatic diols having from 3 to 12 carbon atoms or cycloaliphatic diols having from 6 to 21 carbon atoms, for example radicals of 1,3-propanediol, 2-ethyl-1,3-propanediol, neopentyl glycol, 1,5-pentanediol, 1,6-hexanediol, cyclohexane-1,4-dimethanol, 3-ethyl-2,4-pentanediol, 2-methyl-2,4-pentanediol, 2,2,4-trimethyl-1,3-pentanediol, 2-ethyl-1,3-hexanediol, 2,2-diethyl-1,3-propanediol, 2,5-hexanediol, 1,4-di-(β-hydroxyethoxy)-benzene, 2,2-bis-(4-hydroxycyclohexyl)-propane, 2,4-dihydroxy-1,1,3,3-tetramethyl-cyclobutane, 2,2-bis-(4-β-hydroxyethoxy-phenyl)-propane and 2,2-bis-(4-hydroxypropoxyphenyl)-propane (see U.S. Pat. No. 4,176,224 incorporated herein by reference).

The (co)polyester may be branched by the incorporation of relatively small amounts of tri- or tetra-hydric alcohols or tri- or tetra-basic carboxylic acids, for example according to U.S. Pat. No. 3,692,744 (incorporated herein by reference) Examples of preferred branching agents are trimesic acid, trimellitic acid, trimethylol-ethane and propane and pentaerythritol.

Particular preference is given to polyethylene terephthalates and/or polybutylene terephthalates, with polyethylene terephthalate being especially preferred.

Component C

The graft (co)polymer suitable in the context of the invention has core/shell structure. It may be obtained by graft polymerizing alkyl(meth)acrylate and optionally a copolymerizable vinyl monomer onto a composite rubber core that includes interpenetrated and inseparable interpenetrating network (IPN) type polymer of polyorganosiloxane and alkyl (meth)acrylate, preferably polysiloxane and butylacrylate. The shell is a polymeric rigid phase containing alkyl methacrylate, preferably methylmethacrylate. The weight ratio of polysiloxane/alkyl(meth)acrylate/rigid phase is 70-90/5-15/5-15, preferably 75-85/7-12/7-12, most preferably 80/10/10.

The glass transition temperature of the rubber core is preferably below 0° C., preferably below −20° C., especially below −40° C. The amount of component C present in the inventive composition is 1 to 20, advantageously 2 to 15, preferably 5 to 12, most preferably 7 to 10 phr.

The preferred rubber core has median particle size ($d_{50}$ value) of 0.05 to 5, more preferably 0.1 to 2 microns, especially 0.1 to 1 micron. The median value may be determined by ultracentrifuge measurement (W. Scholtan, H. Lange, Kolloid, Z. und Z. Polymere 250 (1972), 782-1796).

The polyorganosiloxane component in the graft (co)polymer may be prepared by reacting an organosiloxane and a multifunctional crosslinking agent in an emulsion polymerization process. It is also possible to insert graft-active sites into the rubber by addition of suitable unsaturated organosiloxanes.

The organosiloxane is generally cyclic, the ring structures preferably containing from 3 to 6 Si atoms. Examples include hexamethylcyclotrisiloxane, octamethylcyclotetrasiloxane, decamethylcyclopentasiloxane, dodecamethylcyclohexasiloxane, trimethyltriphenylcyclotrisiloxane, tetramethyltetraphenylcyclotetrasiloxane, octaphenylcyclotetrasiloxane, which may be used alone or in a mixture of 2 or more such compounds. The organosiloxane component is present in the silicone acrylate rubber in an amount of at least 70%, preferably at least 75%, based on weight of the graft (co)polymer.

Suitable crosslinking agents are tri- or tetra-functional silane compounds. Preferred examples include trimethoxymethylsilane, triethoxyphenylsilane, tetramethoxysilane, tetraethoxysilane, tetra-n-propoxysilane, tetrabutoxysilane.

Graft-active sites may be included into the polyorganosiloxane component of the silicone acrylate rubber by incorporating a compound conforming to any of the following structures:

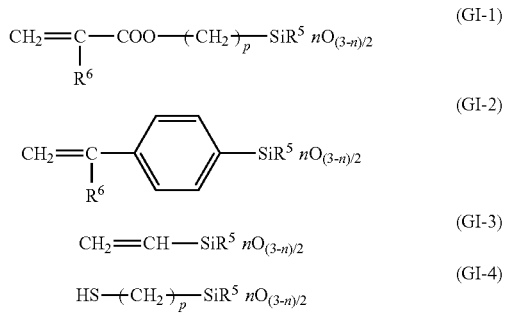

wherein
$R^5$ denotes methyl, ethyl, propyl or phenyl,
$R^6$ denotes hydrogen or methyl,
n denotes 0, 1 or 2, and
p denotes 1 to 6.

(Meth)acryloyloxysilane is a preferred compound for forming the structure (GI-1). Preferred (meth)acryloyloxysilanes include β-methacryloyloxyethyl-dimethoxy-methyl-silane, γ-methacryloyl-oxy-propylmethoxy-dimethyl-silane, γ-methacryloyloxypropyl-dimethoxy-methyl-silane, γ-methacryloyloxypropyl-trimethoxy-silane, γ-methacryloyloxypropyl-ethoxy-diethyl-silane, γ-methacryloyloxypropyl-diethoxy-methyl-silane, γ-methacryloyloxy-butyl-diethoxy-methyl-silane.

Vinylsiloxanes, especially tetramethyl-tetravinyl-cyclotetrasiloxane, are suitable for forming the structure GI-2.

p-Vinylphenyl-dimethoxy-methylsilane, for example, is suitable for forming structure GI-3. γ-Mercaptopropyidimethoxy-methylsilane, γ-mercaptopropylmethoxy-dimethylsilane, γ-mercaptopropyl-diethoxymethylsilane, etc. are suitable for forming structure (GI-4).

The amount of these compounds is up to 10%, preferably 0.5 to 5.0% (based on the weight of polyorganosiloxane).

The acrylate component in the silicone acrylate composite rubber may be prepared from alkyl (meth)acrylates, crosslinkers and graft-active monomer units.

Examples of preferred alkyl (meth)acrylates include alkyl acrylates, such as methyl acrylate, ethyl acrylate, n-propyl acrylate, n-butyl acrylate, 2-ethylhexyl acrylate, and alkyl methacrylates, such as hexyl methacrylate, 2-ethylhexyl methacrylate, n-lauryl methacrylate, n-butyl acrylate is particularly preferred.

Multifunctional compounds may be used as crosslinkers. Examples include ethylene glycol dimethacrylate, propylene glycol dimethacrylate, 1,3-butylene glycol dimethacrylate and 1,4-butylene glycol dimethacrylate.

The following compounds individually or in mixtures may be used for inserting graft-active sites: allyl methacrylate, triallyl cyanurate, triallyl isocyanurate, allyl methacrylate. Allyl methacrylate may also act as crosslinker. These compounds may be used in amounts of 0.1 to 20%, based on the weight of acrylate rubber component.

Methods of producing the silicone acrylate composite rubbers which are preferably used in the compositions according to the invention, and their grafting with monomers, are described, for example, in U.S. Pat. Nos. 4,888,388 and 4,963,619 both incorporated herein by reference.

The graft polymerization onto the graft base (herein C.1) may be carried out in suspension, dispersion or emulsion. Continuous or discontinuous emulsion polymerization is preferred. The graft polymerization is carried out with free-radical initiators (e.g. peroxides, azo compounds, hydroperoxides, persulfates, perphosphates) and optionally using anionic emulsifiers, e.g. carboxonium salts, sulfonic acid salts or organic sulfates.

The graft shell (C.2) may be formed of a mixture of
C.2.1 0 to 80%, preferably 0 to 50%, especially 0 to 25% (based on the weight of the graft shell), of vinyl aromatic compounds or ring-substituted vinyl aromatic compounds (e.g. styrene, α-methylstyrene, p-methylstyrene), vinyl cyanides (e.g. acrylonitrile and methacrylonitrile), and
C.2.2 100 to 20%, preferably 100 to 50%, especially 100 to 75% (based on the weight of the graft shell) of at least one monomer selected from the group consisting of (meth)acrylic acid ($C_1$-$C_8$)-alkyl esters (e.g. methyl methacrylate, n-butyl acrylate, tert.-butyl acrylate) and derivatives (e.g. anhydrides and imides) of unsaturated carboxylic acids (e.g. maleic anhydride and N-phenyl maleimide).

The preferred graft shell includes one or more (meth)acrylic acid ($C_1$-$C_8$)-alkyl esters, especially methyl methacrylate.

Component D

Phosphorus-containing compounds suitable in the context of the invention include oligomeric organic phosphoric or phosphonic acid esters conforming structurally to formula (IV)

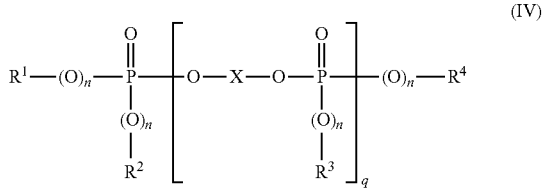

wherein
R¹, R², R³ and R⁴ independently one of the others, each represents $C_1$- to $C_8$-alkyl, or $C_{5-6}$-cycloalkyl, $C_{6-20}$-aryl or $C_{7-12}$-aralkyl each optionally substituted by alkyl, preferably by $C_{1-4}$-alkyl, n independently one of the others denotes 0 or 1, preferably 1, q denotes 0.5 to 30, preferably 0.8 to 15, particularly preferably 1 to 5, especially 1 to 2, and X is a mono- or poly-nuclear aromatic radical having from 6 to 30 carbon atoms, or an aliphatic radical having from 2 to 30 carbon atoms, which may be OH-substituted and may contain up to 8 ether bonds. The aliphatic radical may be linear or branched.

Preferably, R¹, R², R³ and R⁴ each independently of the others represent $C_{1-4}$-alkyl, phenyl, naphthyl or phenyl-$C_{1-4}$-alkyl. In the embodiments where any of R¹, R², R³ and R⁴ is aromatic, it may be substituted by alkyl groups, preferably by $C_{1-4}$-alkyl. Particularly preferred aryl radicals are cresyl, phenyl, xylenyl, propylphenyl or butylphenyl.

In the preferred embodiment X represents a mono- or poly-nuclear aromatic radical having from 6 to 30 carbon atoms. It is preferably derived from any of the aromatic dihydroxy compounds of formula (I).

X particularly preferably represents at least one member selected from the group consisting of

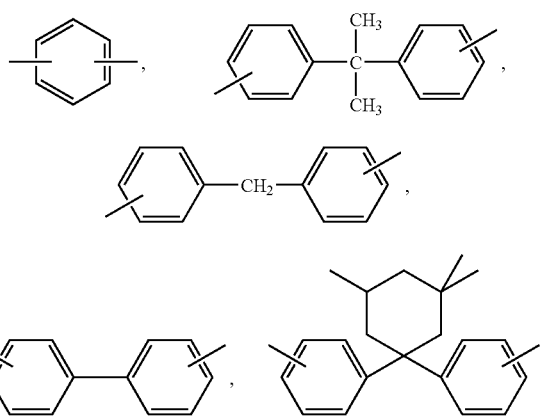

Especially, X may be derived from resorcinol, hydroquinone, bisphenol A or diphenylphenol and particularly preferably from bisphenol A.

Further suitable phosphorus-containing compounds are compounds of formula (IVa)

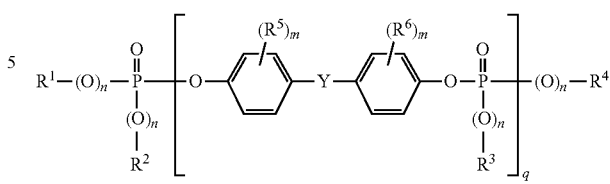

wherein
R¹, R², R³, R⁴, n and q are as defined for formula (IV),
m independently one of the others represents 0, 1, 2, 3 or 4,
R⁵ and R⁶ independently one of the others represents $C_{1-4}$-alkyl, preferably methyl or ethyl, and
Y represents $C_1$- to $C_7$-alkylidene, $C_{1-7}$-alkylene, $C_{5-12}$-cycloalkylene, $C_{5-12}$-cycloalkylidene, —O—, —S—, —SO₂ or —CO—, preferably isopropylidene or methylene.

Particularly preferred is

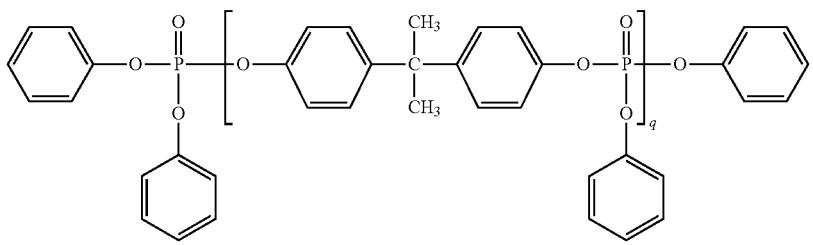

wherein q is 1 to 2.

Such phosphorus compounds are known (see, for example, U.S. Pat. Nos. 5,204,394 and 5,672,645, both incorporated herein by reference) or may be prepared by known methods (e.g. Ullmanns Enzyklopädie der technischen Chemie, Vol. 18, p. 301 et seq. 1979; Houben-Weyl, Methoden der organischen Chemie, Vol. 12/1, p. 43; Beilstein Vol. 6, p. 177).

Component D is present in the inventive composition in amount of 2 to 20, preferably 5 to 15, particularly preferably 7 to 15 most preferably 10 to 15 phr.

Component E

Fluorinated polyolefins are known (e.g., U.S. Pat. No. 5,672,645 incorporated herein by reference) and commercially available such as Teflon® 30N fluorinated polyolefin from DuPont.

The fluorinated polyolefins may be used either as such or in the form of a coagulated mixture. The preparation of a coagulated mixture entails mixing an emulsion of the fluorinated polyolefins with an emulsion of the graft polymer or with an emulsion of a vinyl-monomer-based (co)polymer, and coagulating the mixture.

The fluorinated polyolefins may also be used as a precompound with the graft (co)polymer (component C) by mixing the polyolefin powder with a powder or with granules of the graft polymer and compounding in conventional devices in the melt, generally at temperatures of from 200 to 330° C.

The fluorinated polyolefin is used in the composition at concentrations of 0.1 to 2, preferably 0.2 to 1, most preferably 0.2 to 0.5 phr.

Component F

The boron compound suitable in the context of the present invention is not particularly limited so long as it is a compound having a boron atom. Examples include boric acid, boron oxide and borates. The borates include zinc borates such as zinc tetraborate, zinc metaborate and basic zinc borate, barium borates such as barium orthoborate, barium metaborate, barium diborate and barium tetraborate, lead borate, cadmium borate and magnesium borate. Such boron compounds may be used alone or in combination as a mixture of two or more of them.

The preferred boron compound is Zinc borate. The preferred zinc borate has the general chemical formula mZnO.B2O3.xH2O where the ratio of x/m/n is around 0-7/1-5/2-6. This borate is well known and commercially available. The average particle diameter is between 2 and 10 microns, advantageously 4 to 6 microns, alternatively 8-10 microns.

Polycarbonate: a bisphenol-A based homopolycarbonate having melt flow rate of about 4 g/10 min (at 300° C., 1.2 kg) per ASTM D 1238 (Makrolon 3208, a product of Bayer MaterialScience LLC).

PET: polyethylene terephthalate having an intrinsic viscosity of 0.94.

Elastomer 1: methyl methacrylate (MMA)-grafted siloxane (Si)-butyl acrylate (BA)composite rubber containing MMA shell and Si-BA in the core. The weight ratio of Si/BA/MMA is 80/10/10.

Elastomer 2 (comparative): methyl methacrylate (MMA)-grafted siloxane(Si)-butyl acrylate (BA)composite rubber containing MMA shell and Si-BA in the core. The weight ratio of Si/BA/MMA is 10/80/10.

The phosphorous compound (designated P-compound) used conforms to

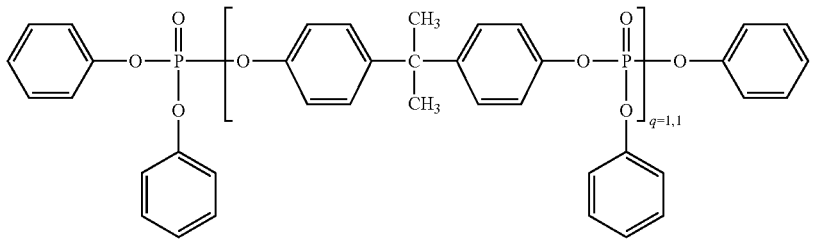

Particle size and particle diameter always means the average particle diameter.

Other Components

The inventive composition may further include additives that are known for their function in the context of thermoplastic molding compositions that contain poly(ester)carbonates. These include any one or more of lubricants, mold release agents, for example pentaerythritol tetrastearate, nucleating agents, antistatic agents, thermal stabilizers, light stabilizers, hydrolytical stabilizers, fillers and reinforcing agents, colorants or pigments, as well as further flame retarding agents or a flame retarding synergists.

The inventive compositions may be prepared conventionally using conventional equipment and following conventional procedures.

The inventive composition may be used to produce moldings of any kind by thermoplastic processes such as injection molding, extrusion and blow molding methods.

The Examples which follow are illustrative of the invention.

EXAMPLES

In the preparation of exemplified compositions, the components and additives were melt compounded in a twin screw extruder ZSK 30 at a temperature profile from 120 to 255° C. The pellets obtained were dried in a forced air convection oven at 110° C. for 4 to 6 hours. The parts were injection molded (melt temperature 265 to 285° C., mold temperature about 75° C.).

In preparing the compositions described below the following components were used:

All exemplified compositions contained 0.25 phr fluorinated polyolefin (PTFE) introduced in the form of a masterbatch containing 50 wt. % styrene-acrylonitrile copolymer and 50 wt. % PTFE.

Boron compound: Zinc borates 1, 2 and 3 were chemically identical and different one from the others in terms of their particle size. The average particle diameter of "zinc borate 1" was 5 microns, of "zinc borate 2", 9 microns, and of "zinc borate 3", 1.8 microns.

Flammability was determined according to UL-94 V on specimens having the indicated thickness.

Specific optical density of smoke under flaming was determined in accordance with ASTM E662 flaming on 2 mm plaques.

The melt flow rates (MVR) of the compositions were determined in accordance with ASTM D-1238 at 265° C., 5 Kg load. Vicat temperature (Vicat) was determined in accordance with ASTM D 1525 with a load of 50 Newton and a heating rate of 120° C./hour.

TABLE 1

| | 1-1 | 1-2 | *C-1 | *C-2 |
|---|---|---|---|---|
| Polycarbonate, wt % | 75 | 75 | 75 | 75 |
| PET, wt % | 25 | 25 | 25 | 25 |
| Elastomer 1, phr | 10 | 10 | 10 | |
| Elastomer 2, phr | | | | 10 |
| P-compound, phr | 10 | 10 | 10 | 10 |
| Zinc borate 1, phr | 5 | | | 5 |
| Zinc borate 2, phr | | 5 | | |
| Zinc borate 3, phr | | | 5 | |
| MVR (cm³/10 min) | 19.6 | 17.9 | 22.08 | 17.15 |
| Vicat (° C.) | 103.85 | 103 | 105.5 | 105.75 |
| UL 94 V 1.6 mm | V1 | V0 | Failure | Failure |
| Specific optical smoke density at 1.5 minutes | 38 | 35 | 31 | 42 |
| Specific optical smoke density at 4 minutes | 136 | 147 | 133 | 123 |

*denotes a comparative example

Examples 1-1 and 1-2 representing the invention and comparative example 1 (C-1) point to the dependence of flame retardance on the particle size of the included boron compound. Comparative-1 (average particle size of the boron compound 1.8 micron) had a failure rating in UL 94 V burning whereas 1-1 (average particle size 5 micron) and 1-2 (average particle size 9 micron) showed ratings of, respectively V1 and V0.

The comparison between 1-1 to C-2 shows the criticality of the compositional makeup of the included elastomer on flammability. Accordingly, in the context of the invention, the elastomer having higher concentration of siloxane imparts to the composition a greater flame resistance.

A corresponding conclusion is drawn based on a comparison between examples 2-3 to C-3 in Table 2. Here too, the flammability of the composition depends on the chemical makeup of the included elastomer.

The inventive compositions exhibit low specific optical smoke density (below 200 at 4 minutes). Specific optical smoke density of 200 at 4 minutes is typically the upper limit set for aircraft applications.

TABLE 2

|  | 2-3 | C-3 |
| --- | --- | --- |
| Polycarbonate, wt % | 85 | 85 |
| PET, wt % | 15 | 15 |
| Elastomer 1, phr | 10 |  |
| Elastomer 2, phr |  | 10 |
| P-compound, phr | 6 | 6 |
| zinc borate 1, phr | 5 | 5 |
| MVR (cm³/10 min) | 11.79 | 10.75 |
| Vicat (° C.) | 117.4 | 118.2 |
| UL 94 V 1.6 mm | V0 | Failure |
| Specific optical smoke density at 1.5 minutes | 35 | 48 |
| Specific optical smoke density at 4 minutes | 111 | 143 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A thermoplastic molding composition comprising
   A) 60 to 99 percent by weight (pbw) aromatic poly(ester) carbonate having a weight-average molecular weight of at least 25,000,
   B) 1 to 40 pbw (co)polyester having an intrinsic viscosity from 0.94 deciliter/gram to 2.5 deciliter/gram, wherein the weight of A) and B) totals 100 parts (100 parts resin),
   C) 1 to 20 parts per 100 parts resin (phr) graft (co)polymer having a core-shell morphology, comprising a grafted shell that contains polymerized alkyl(meth)acrylate and a composite rubber core that contains interpenetrated and inseparable polyorganosiloxane and poly(meth)alkyl acrylate where the weight ratio of polyorganosiloxane/poly(meth)alkylacrylate/grafted shell is 70-90/5-15/5-15,
   D) 2 to 20 phr phosphorus-containing compound,
   E) 0.1 to 2 phr fluorinated polyolefin and
   F) 0.1 to 15 phr zinc borate having average particle diameter of 5 to 9 microns.

2. The composition of claim 1 wherein said aromatic poly(ester) carbonate is a homopolycarbonate based on bisphenol A.

3. The composition of claim 1 wherein said (co)polyester is polyethylene terephthalate.

4. The composition of claim 1 wherein said graft (co)polymer is present in an amount of 2 to 15 phr.

5. The composition of claim 1 wherein said phosphorous compound is a member selected from the group consisting of phosphoric acid ester and phosphonic acid ester.

6. The composition of claim 5 wherein said member conforms structurally to formula (IV)

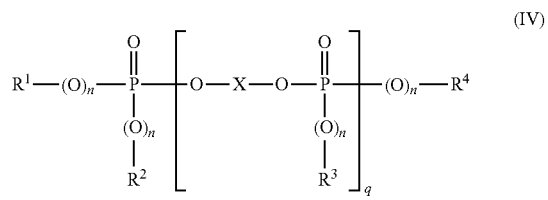

wherein
R¹, R², R³ and R⁴ independently one of the others, each represents $C_1$- to $C_8$-alkyl, or $C_{5-6}$-cycloalkyl, $C_{6-20}$-aryl or $C_{7-12}$-aralkyl,
n independently one of the others denotes 0 or 1,
q denotes 0.5 to 30, and
X is a mono- or poly-nuclear aromatic radical having from 6 to 30 carbon atoms, or an aliphatic radical having from 2 to 30 carbon atoms.

7. The composition of claim 1 wherein the fluorinated polyolefin is present in an amount of 0.2 to 1 phr.

8. The composition of claim 1 wherein said zinc borate is present in an amount of 1 to 10 phr.

9. A thermoplastic molding composition comprising
   A) 70 to 95 pbw aromatic polycarbonate carbonate having a weight-average molecular weight of at least 26,000 g/mol.,
   B) 5 to 30 pbw of polyethylene terephthalate having an intrinsic viscosity from 0.94 deciliter/gram to 2.5 deciliter/gram, wherein the weight of A) and B) totals 100 parts (100 parts resin),
   C) 2 to 15 phr graft (co)polymer having a core-shell morphology, comprising a grafted shell that contains polymerized methylmethacrylate and a composite rubber core that contains interpenetrated and inseparable polyorganosiloxane and polyalkyl acrylate components, where the weight ratio of polyorganosiloxane/polyalkyl acrylate/polymerized methylmethacrylate is 70-90/5-15/5-15,
   D) 5 to 15 phr of a phosphorus-containing compound conforming structurally to formula (IV)

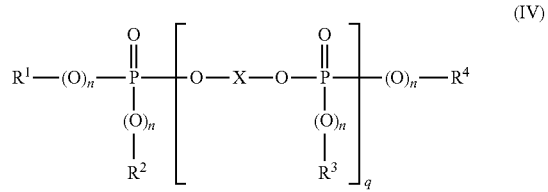

wherein
R¹, R², R³ and R⁴ independently one of the others, each represents $C_1$- to $C_8$-alkyl, or $C_{5-6}$-cycloalkyl, $C_{6-20}$-aryl or $C_{7-12}$-aralkyl,
n independently one of the others denotes 0 or 1,
q denotes 0.5 to 30, and X is a mono- or poly-nuclear aromatic radical having from 6 to 30 carbon atoms, or an aliphatic radical having from 2 to 30 carbon atoms, E) 0.2 to 1 phr fluorinated polyolefin and F) 1 to 10 phr zinc borate having average particle diameter of 5 to 9 microns.

10. The composition of claim 9 wherein the zinc borate conforms to the general chemical formula mZnO.nB2O3.xH2O and where the ratio of x/m/n is 0-7/1-5/2-6.

11. The composition of claim 9 wherein the average particle diameter is 4 to 6 microns.

12. The composition of claim 9 wherein the average particle diameter is 8-10 microns.

13. The composition of claim 1 further containing at least one member selected from the group consisting of lubricant, mold-release agent, nucleating agent, antistatic, thermal stabilizer, hydrolytical stabilizer, light stabilizer, colorant, pigment, filler, reinforcing agent, flame proofing agent other than component D), and flame proofing synergist.

14. The composition of claim 1, wherein the (co)polyester has an intrinsic viscosity from 1.3 deciliter/gram to 2.5 deciliter/gram.

15. The composition of claim 9, wherein the polyethylene terephthalate has an intrinsic viscosity from 1.3 deciliter/gram to 2.5 deciliter/gram.

* * * * *